Feb. 5, 1935.  H. C. MURPHY  1,990,198
METHOD OF AND APPARATUS FOR PREPARING AND SUPPORTING FROZEN EDIBLES
Filed July 20, 1932
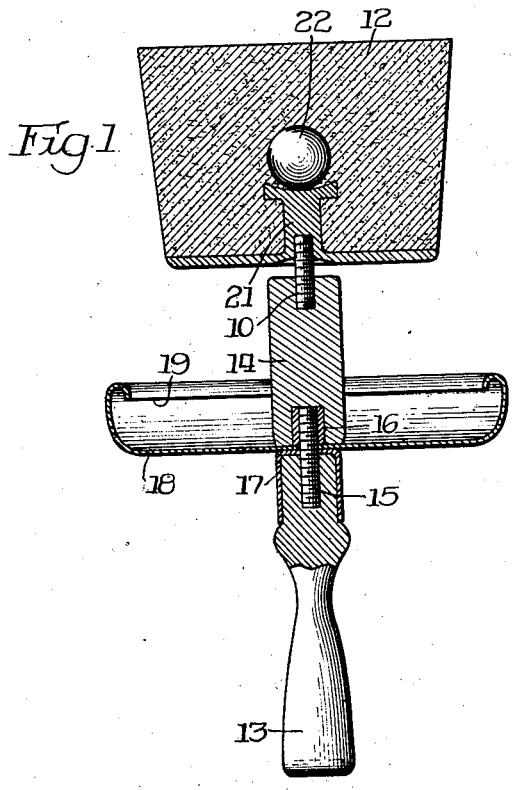
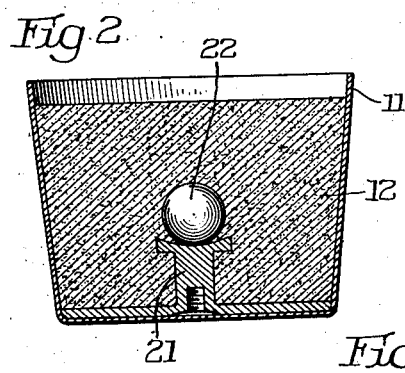
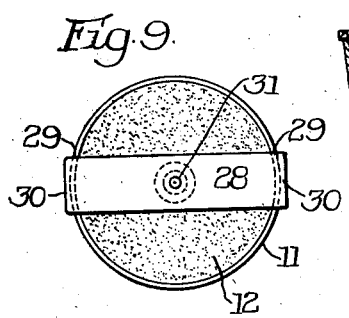
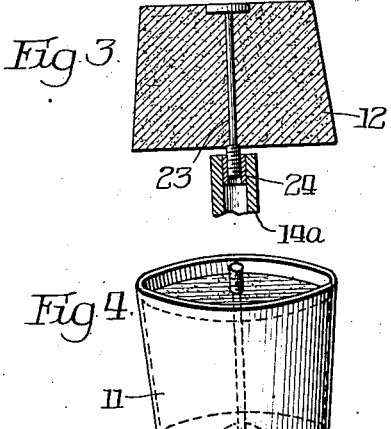
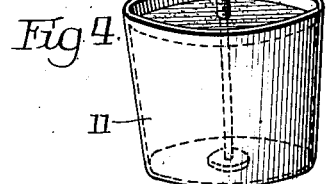
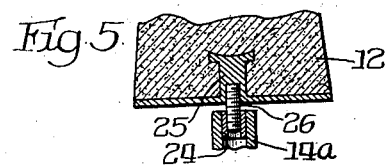
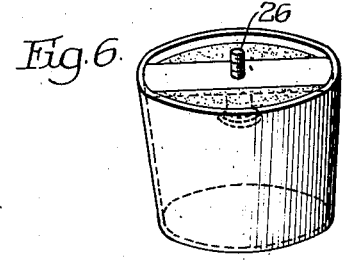
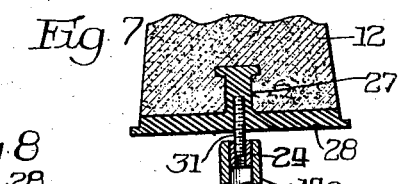
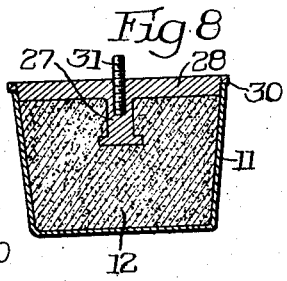
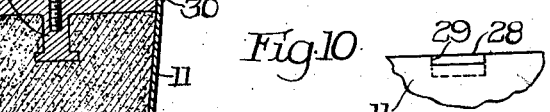
Inventor
Harvey Clyde Murphy
By Grindahl Parker Carlson
Attys Patented Feb. 5, 1935

1,990,198

UNITED STATES PATENT OFFICE 1,990,198

METHOD OF AND APPARATUS FOR PREPARING AND SUPPORTING FROZEN EDIBLES

Harvey Clyde Murphy, Evanston, Ill., assignor, by direct and mesne assignments, of 50 per cent to Emerson Bard Priddy and 20 per cent to Sara Lucile Priddy, both of Chicago, Ill.; 10 per cent to Gordon C. Graham, Evanston, Ill.; and 20 per cent to General Engineering Works, Chicago, Ill., a corporation of Illinois Application July 20, 1932, Serial No. 623,548

5 Claims. (Cl. 107—19)

This invention relates to a method of and apparatus for preparing frozen confections or edibles in small units and to means for supporting each unit in the hand while being eaten.

The general object of the invention is to provide a novel method and apparatus of this character by which a person may quickly and conveniently prepare small frozen edible units for children through the medium of an ordinary domestic mechanical refrigerator, utilizing the shallow freezing space which is customarily provided in such refrigerators for insertion of cellular trays to freeze ice cubes.

Another object is to provide a method and apparatus by which an anchor element is frozen into each unit to provide means of attachment of a handle by which the frozen unit may be supported in the hand while being eaten.

A further object is to provide a support for the frozen unit which includes an anchor element wholly or partly embedded in the frozen unit, a handle having a jointed connection with said anchor element to serve as a support for the frozen unit, and a drip pan also supported by the handle in a position below the lower end of the frozen unit so as to receive drippings from said unit as it melts without obstructing free access to all parts of the unit while being consumed.

Another object is to provide in a support of this character means for insulating the anchor element from the handle so as to prevent the conduction of heat from the handle to the anchor element and thereby avoid loosening of the frozen unit from the anchor by melting of said unit.

Ancillary objects and advantages of the invention will become apparent from the following detailed description taken in connection with the accompanying drawing, in which:

Figure 1 is an axial sectional view illustrating a frozen edible unit produced in accordance with this invention and showing the unit mounted upon a handle in readiness to be eaten.

Fig. 2 is an axial sectional view showing the frozen unit in the container or mold before removal.

Figs. 3 and 4 are sectional views illustrating a modified form of anchor element and its relation to a supporting handle and a container.

Figs. 5 and 6 are views illustrating another modification of an anchor element.

Figs. 7 and 8 illustrate still another modification of an anchor element.

Figs. 9 and 10 are respectively a plan view and a fragmental elevation of the structure shown in Fig. 8.

My invention is susceptible of various modifications and alternative constructions and although I shall herein describe some of the preferred forms I would have it understood that the invention is not limited to the present disclosure and that I aim to cover in the appended claims all modifications, alternatives, and equivalents falling within the scope of the invention.

In preparing frozen edible units in accordance with my invention I provide a container or mold or a series of such containers or molds of such depth and dimensions that they may be readily inserted into the shallow space commonly provided in the low temperature zone of a domestic mechanical refrigerator, which space is usually employed to receive a cellular tray or trays for freezing ice cubes. In Figs. 2, 4, 6, 8 and 9 the containers or molds are designated 11. In each container I place an anchor element of such shape and dimensions that it will be receivable with the container into the refrigerator space referred to. The form of the anchor element and its relation to the container may vary considerably. Herein I have shown four different forms of anchors, the one shown in Figs. 1 and 2, however, being the form which I prefer. The anchor elements are equal in number to the containers, that is one anchor for each container, and each anchor is placed in the container in such position that it will be wholly or partially immersed in the edible, designated 12, when poured into the container in fluid or plastic condition. The containers with the fluid edible and the anchors therein are then placed in the freezing space in the refrigerator and allowed to remain there until the edible has been frozen or chilled into a condition which is solid or sufficiently solid to permit the edible and the anchor to be removed as a unit from the container and to cause the frozen edible to hold firmly to the anchor element. When sufficiently frozen or solidified, the containers are removed from the refrigerator and each frozen unit with its embedded anchor is removed from the container. The units are then ready to be eaten.

In preparing certain kinds of edibles, such as candy, the material will solidify at room temperatures, in which case it is not necessary that the material be frozen or chilled in a refrigerator.

To facilitate handling the units while being eaten, I provide a support or handle, which will presently be described in detail, and which is arranged to have a jointed connection with any of the anchor elements, and I provide on the handle a saucer-like receptacle to receive drippings from the edible unit as it melts.

Referring now to the details of construction which have been illustrated in the drawing as exemplifying my invention, the support comprises a lower handle section 13 and an upper section 14 which are herein shown as connected together by a screw 15 solidly seated in the handle portion 13, which may be of wood, and threaded at its upper end in a metallic bushing 16 fixed in the upper section 14 which may also be of wood. 17 designates a metallic ferrule on the upper end of the handle 13.

A receptacle or drip plan 18 which may be of saucer-like form with an inturned lip 19 at its upper edge, has a central aperture receiving the screw 15, the bottom of said receptacle being clamped between the two sections 13, 14 of the support.

In the upper end of the section 14 is a screw 20 solidly seated in the wood and projecting upward to provide a stud for reception in a screw threaded socket in the anchor element.

The anchor element 21 illustrated in Figs. 1 and 2 comprises a base portion which may be in the form of a long narrow bar, the lengths of which is such as to fit snugly within the bottom of the mold 11 with the bar extending diametrically across the mold. The anchor further comprises a neck portion with an enlarged head at the end thereof, the upper end of the head being shown as having a recess or concavity therein to receive an article 22 such as a cherry, a piece of candy, or if desired a "prize", which will then occupy the centrl portion of the frozen edible unit. When the frozen unit and its embedded anchor have been removed from the container 11, the unit may be quickly mounted upon the support by turning the screw stud 20 into the socket in the anchor 21.

With this form of anchor element the anchor is first placed in the bottom of the container, as seen in Fig. 2, and the fluid edible is then poured into the container. The anchor is of heavy material such as metal so that it will not float but will seat snugly on the bottom wall. The air which fills the screw threaded socket in the anchor will thus be trapped to provide an air cushion acting to prevent liquid from entering said socket. To further insure against the approach of liquid into said socket I provide a shallow recess in the bottom of the anchor immediately surrounding the socket so as to enlarge the body of air which will be trapped and to prevent the liquid from flowing in close to the socket proper. Thus when the frozen unit is removed there will be no film of ice over the socket which might interfere with the insertion of the stud 20 thereinto.

The side walls of the container 11 are preferably flared upwardly to facilitate removal of the frozen unit from the container and it will be noted that when the unit is mounted on the support the sides of the frozen unit taper downwardly which taper assists in insuring that melted portions or drippings from the unit will flow into the receptacle 18. It will be noted also that the receptacle 18 is positioned in a plane substantially below the anchor and the frozen material so that the receptacle does not obstruct free access to the frozen material while being eaten.

The section 14 of the support being made of heat-insulating material, such for example as wood, minimizes the conduction of heat from the support or the user's hand into the anchor element 21 and thereby prevents rapid melting of the frozen material at its area of contact with the anchor so that the frozen material maintains its firm grip upon the anchor until fully consumed. It will be noted that the bar-like base portion of the anchor, extending as it does diametrically across the lower end of the frozen unit prevents rotation of the unit relative to the anchor.

In the modification shown in Figs. 3 and 4, the anchor 23 comprises a shank with an enlarged head at one end and a threaded portion at its other end which threaded portion is adapted to be received in a threaded metallic bushing 24 fixed in the upper end of the upper section 14ᵃ of the supporting handle. As seen in Fig. 4, this anchor is placed in the container 11 with its head portion resting on the bottom of the container. The anchor is made of a length approximately equal to the depth of the container or at least such that the threaded portion of the anchor may readily extend above the level of the fluid edible when the container is nearly full of such edible.

In the modification shown in Figs. 5 and 6, the anchor 25 is generally similar in form and size to the anchor shown in Figs. 1 and 2 but is made of a material having a specific gravity less than that of any fluid edible which would be placed in the container so that the anchor will float on the surface of such fluid with the base or bar portion of the anchor at the surface of the fluid and with the neck and head portions hanging downwardly therefrom. The anchor carries a screw threaded stud 26 which is receivable in a threaded bushing 24 in the support in the same manner as described in connection with Figs. 3 and 4.

In the modification shown in Figs. 7 to 10, the anchor element 27 comprises a base or bar portion 28 of such length as to fit diametrically within the upper end of the container 11 and to be in the upper end of the container supported thereby. If desired, the container may have notches 29 therein to receive projections 30 on the ends of the bar 28 to assist in positioning the anchor in the container. This form of anchor may have a headed neck portion projecting from the bar 28 similar to the form shown in Figs. 1 and 5 and it may also have a screw stud 31 to engage with a support 14ᵃ in the same manner as described in connection with Figs. 3 to 6.

In the manufacture of this apparatus I have provided a set consisting of five containers 11, five duplicate anchors and one support on which any of the anchors with the frozen unit thereon may be mounted. The containers 11 may either be individual and separate from each other or they may be made in the form of a tray with individual cells therein.

I also contemplate that the anchor elements, the supporting handles, and the receptacles 18 may be made of such inexpensive materials and construction that the composite device with the frozen edible unit thereon may constitute an article of manufacture to be sold as an entity by retailers. The particular structure shown in the present drawings is more especially intended for a household set to enable mothers quickly and conveniently to make frozen "suckers" at home for their children. The receptacle 18 serves the purpose of preventing drippings from the frozen unit from falling upon the children's clothes and carpets or furniture.

I claim as my invention:

1. An apparatus of the character described comprising a container, an anchor element arranged to bear against an inner wall of said container and to interlock with solidified edible in said container, said anchor element having a socket therein facing the said wall of the container which socket is constructed to receive a handle by which the edible may be supported in the hand while being eaten.

2. An apparatus of the character described comprising a fluid container, an anchor element resting on the bottom of said container having an anchoring portion to interlock with frozen fluid in said container, said anchor further having a handle engaging socket and an immediately surrounding shallow recess in its lower side facing the bottom of said container, said socket and recess containing an air cushion acting to prevent the entrance of fluid from said container into said socket.

3. A holder for a frozen edible unit comprising, in combination, an anchor element having a portion securely embedded in said unit, a support comprising a lower handle section and an upper section secured together, means providing a movable joint between said upper section and said anchor element, and a drip pan mounted on said support and having its bottom wall clamped between said two sections thereof.

4. An apparatus of the character described comprising, in combination, a fluid container, an anchor adapted to rest on the bottom of the container and to be covered by fluid, said anchor having a handle-engaging socket opening downwardly to retain the air therein as the anchor is covered by fluid and thus prevent clogging of said socket by fluid.

5. An apparatus for use in preparing a frozen edible unit comprising, in combination, a container for holding the edible material while being frozen, an anchor member receivable within said container in position to be embedded in the edible material while being frozen, and a handle member structurally separate from and detachably engageable with said anchor member to facilitate withdrawal of the frozen unit from the container and to support the frozen unit while being eaten, said anchor and handle members having thereon coupling elements comprising a stud and a socket shaped for detachable interfitting engagement with each other, said container and said anchor member being dimensioned and constructed for interengagement to position the anchor member with its handle coupling element exposed at one surface of the frozen unit ready for attachment of the complementary coupling element on the handle member.

HARVEY CLYDE MURPHY.